(12) United States Patent
Petersen

(10) Patent No.: US 8,225,450 B2
(45) Date of Patent: Jul. 24, 2012

(54) MULTIFUNCTIONAL NOZZLE ATTACHMENT FOR LAWN BLOWER

(76) Inventor: Kenneth W. Petersen, Tall, FL (US)

( * ) Notice: Subject to any disclaimer, the term of this patent is extended or adjusted under 35 U.S.C. 154(b) by 1078 days.

(21) Appl. No.: 12/148,207

(22) Filed: Apr. 17, 2008

(65) Prior Publication Data

US 2009/0260175 A1    Oct. 22, 2009

(51) Int. Cl.
*A47L 5/14* (2006.01)

(52) U.S. Cl. ...... 15/106; 15/111; 15/236.01; 15/238.08; 15/246; 15/327.5; 15/344; 15/345; 15/393; 15/398; 15/401; 15/402; 15/400

(58) Field of Classification Search ............ 15/106, 15/111, 159.1, 176.1–176.5, 236.01, 236.08, 15/216, 246, 344, 393, 398, 400–402, 345, 15/327.5; *A47L 5/14*
See application file for complete search history.

(56) References Cited

U.S. PATENT DOCUMENTS

| | | | |
|---|---|---|---|
| 29,139 A | 7/1860 | Messner | |
| 4,288,886 A | 9/1981 | Siegler | |
| 4,402,106 A | 9/1983 | Mattson | |
| 4,413,371 A | 11/1983 | Tuggle et al. | |
| 4,474,327 A | 10/1984 | Mattson et al. | |
| 4,945,604 A * | 8/1990 | Miner et al. | 15/344 |
| 5,054,159 A * | 10/1991 | Richardson | 15/400 |
| 5,060,339 A | 10/1991 | Evers | |
| 5,107,566 A | 4/1992 | Schmid | |
| 5,272,858 A | 12/1993 | Bonis | |
| 5,535,479 A | 7/1996 | Pink et al. | |
| 5,950,276 A | 9/1999 | Everts et al. | |
| 5,964,420 A | 10/1999 | Hampton | |
| 5,991,973 A * | 11/1999 | Simpson | 15/402 |
| 6,353,960 B1 * | 3/2002 | Jannicelli, Jr. | 15/246 |
| 7,510,225 B1 * | 3/2009 | Stinnett et al. | 294/59 |
| 7,814,615 B1 * | 10/2010 | Ries | 15/405 |

* cited by examiner

*Primary Examiner* — David Redding
(74) *Attorney, Agent, or Firm* — J. Wiley Horton

(57) ABSTRACT

A multifunctional nozzle attachment for a portable hand-held lawn blower. The multifunctional nozzle attachment includes a coupler which can be attached to the nozzle of the lawn blower. Various attachments including scrapers, rakes, and brushes are provided for use with the coupler. When attached to the coupler, the attachments may be used to break up debris that does not release from the ground using the air stream alone. Once the debris is broken up, the air stream carries the debris away.

15 Claims, 4 Drawing Sheets

MULTIFUNCTIONAL NOZZLE ATTACHMENT FOR LAWN BLOWER

CROSS-REFERENCE TO RELATED APPLICATIONS

Not Applicable.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of lawn blowers. More specifically, the present invention comprises a multifunctional nozzle attachment for a lawn blower.

2. Description of the Related Art

Portable hand-held lawn blowers are commonly used for various home maintenance tasks. Hand-held lawn blowers are most commonly powered by gasoline engines or electric motors. The output shaft of the engine or motor drives an impeller which generates air flow. The air is fed to an air tube and out a nozzle. The velocity of the air flow exiting the nozzle of conventional lawn blowers is sufficient for blowing small quantities of dry leaves or grass clippings. The velocity of the air flow exiting a standard blower nozzle is usually insufficient to move large clumps of wet or muddy leaves, however.

To address this problem, many lawn blower manufacturers provide an assortment of nozzles which may be interchangeably attached to the end of the air tube. In order to increase air flow velocity, the user may attach a reducer nozzle to the end of the air tube. Reducer nozzles present other challenges, however. Reducer nozzles produce a concentrated air stream which tends to blow debris around wildly. Furthermore, when using a reducer nozzle, a user only covers a fraction of the area in the same amount of time that would be covered using a more dispersive nozzle. Prior art lawn blower nozzles have other limitations which will be more readily apparent to the reader after reading the description of the present invention.

BRIEF SUMMARY OF THE INVENTION

The present invention is a multifunctional nozzle attachment for a portable hand-held lawn blower. The nozzle attachment may also be used with the varieties of lawn blowers that are worn on the user's back. The multifunctional nozzle attachment includes a coupler which can be attached to the nozzle of the lawn blower. Various tools including scrapers, rakes, and brushes are provided for use with the coupler. When attached to the coupler, the tools may be used to break up debris that does not release from the ground using the air stream alone. Once the debris is broken up, the air stream carries the debris away.

In the preferred embodiment, a track ball is provided on the coupler. The track ball holds the tool at the desired angle relative to the ground for optimal performance. The track ball rolls inside of a housing so that the coupler glides across the ground.

REFERENCE NUMERALS IN THE DRAWINGS

| | |
|---|---|
| 10 | blower tube |
| 12 | nozzle |
| 14 | coupler |
| 16 | collar |
| 18 | attachment plate |
| 20 | track ball housing |
| 22 | pins |
| 24 | scraper |
| 26 | slots |
| 28 | debris |
| 30 | surface |
| 32 | track ball |
| 34 | rake |
| 36 | brush |
| 38 | bristles |

DETAILED DESCRIPTION OF THE INVENTION

Figure 1:
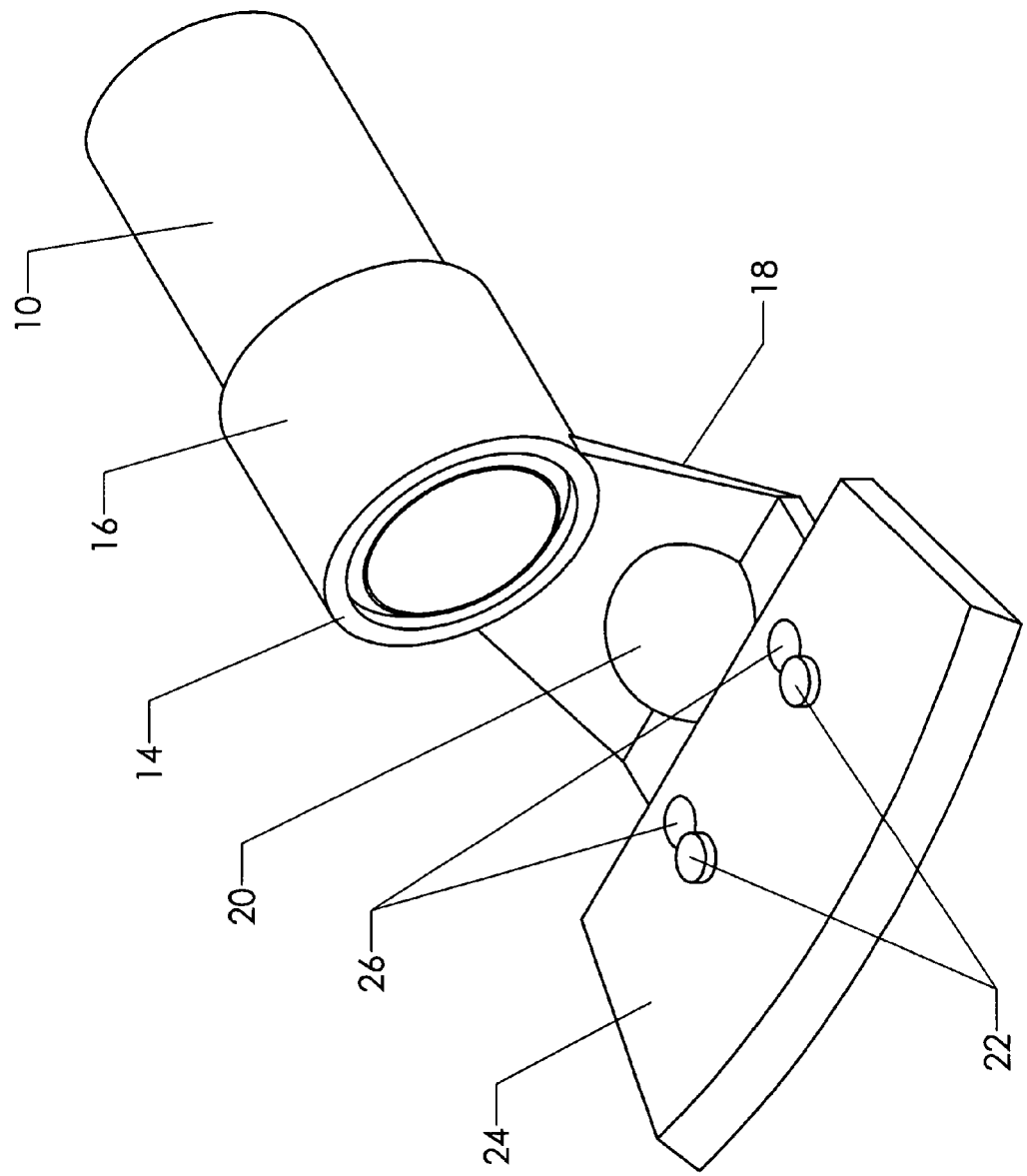
FIG. 1 is a perspective view, showing the present invention.
Figure 2:
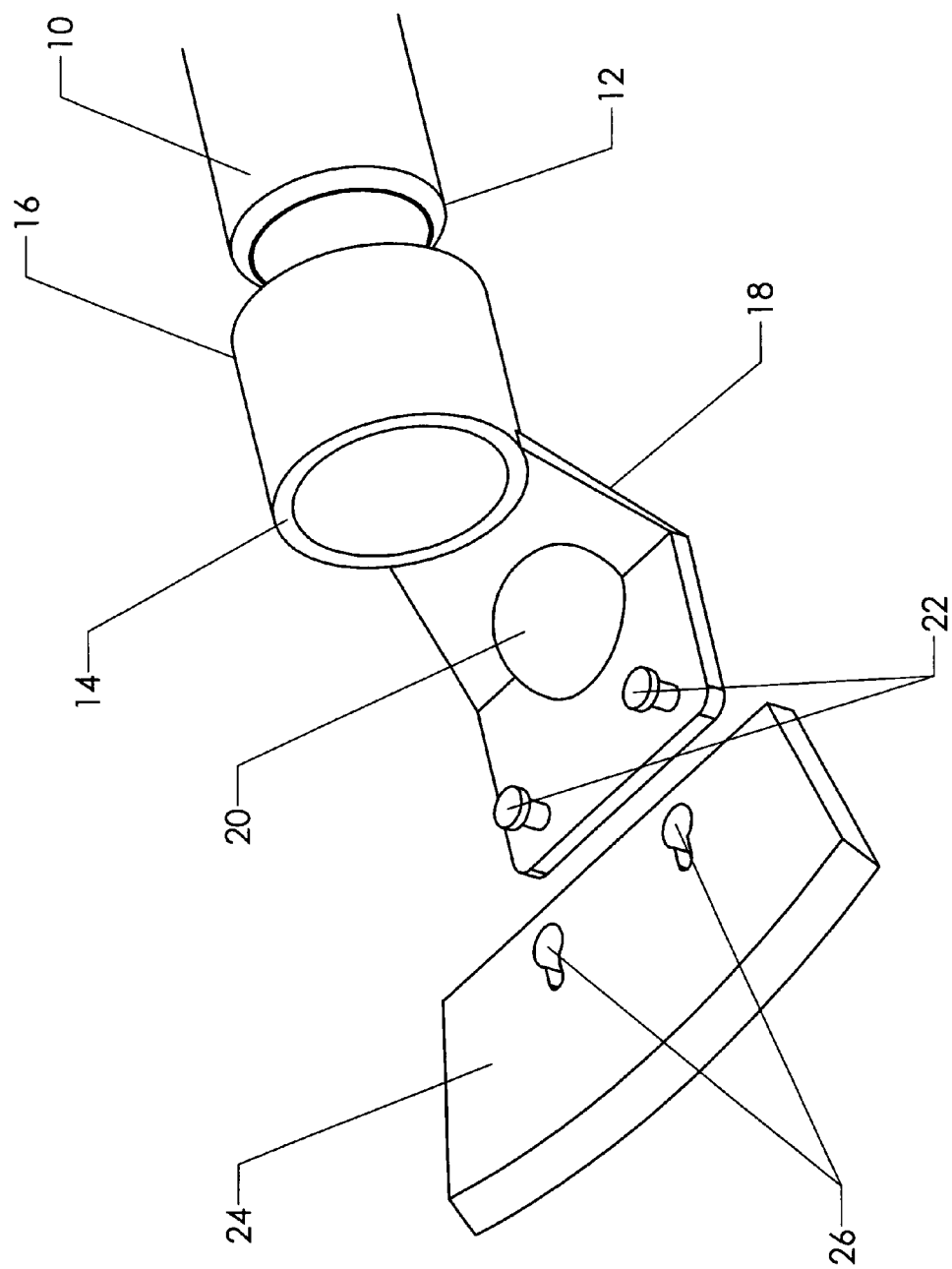
FIG. 2 is an exploded perspective view, showing the present invention.

The present invention is a multifunctional nozzle attachment for a portable hand-held lawn blower. The present invention is illustrated in an assembled state in FIG. 1 and in a disassembled state in FIG. 2. Coupler 14 includes collar 16 which wraps around attaches to nozzle 12 of blower tube 10. In order to insure snug fitment on blower tube 10, collar 16 may be slightly tapered from one end to the other. In this embodiment, coupler 14 will slide along the exterior surface of nozzle 12 of blower tube 10 a short distance until the narrowing inner diameter of collar 16 matches the outer diameter of nozzle 12. Of course, various other features may be employed to attach coupler 14 to nozzle 12.

Attachment plate 18 attaches to coupler 14 and extends away from nozzle 12 when coupler 14 is attached to nozzle 12. Track ball housing 20 is preferably integrated into attachment plate 20. Track ball housing 20 contains track ball 32 (shown more clearly in FIG. 3) which rolls along the ground or other surface when the attachment is used. Attachment plate 18 has a pair of pins 22 which are used as an attachment means for attaching scraper 24 to the end of attachment plate 18.

Scraper 24 includes a pair of slots 26 which are configured to receive pins 22 when scraper blade 24 is placed on top of attachment plate 18. Although pins 22 and slots 26 are used in the current example, the reader should appreciate that various attachment means may be used for attaching scraper 24 to attachment plate 18 including but not limited to fasteners, tabs, and snaps. Scraper 24 has a tapered edge so that scraper 24 may easily slide under mud and other debris.

Figure 3:
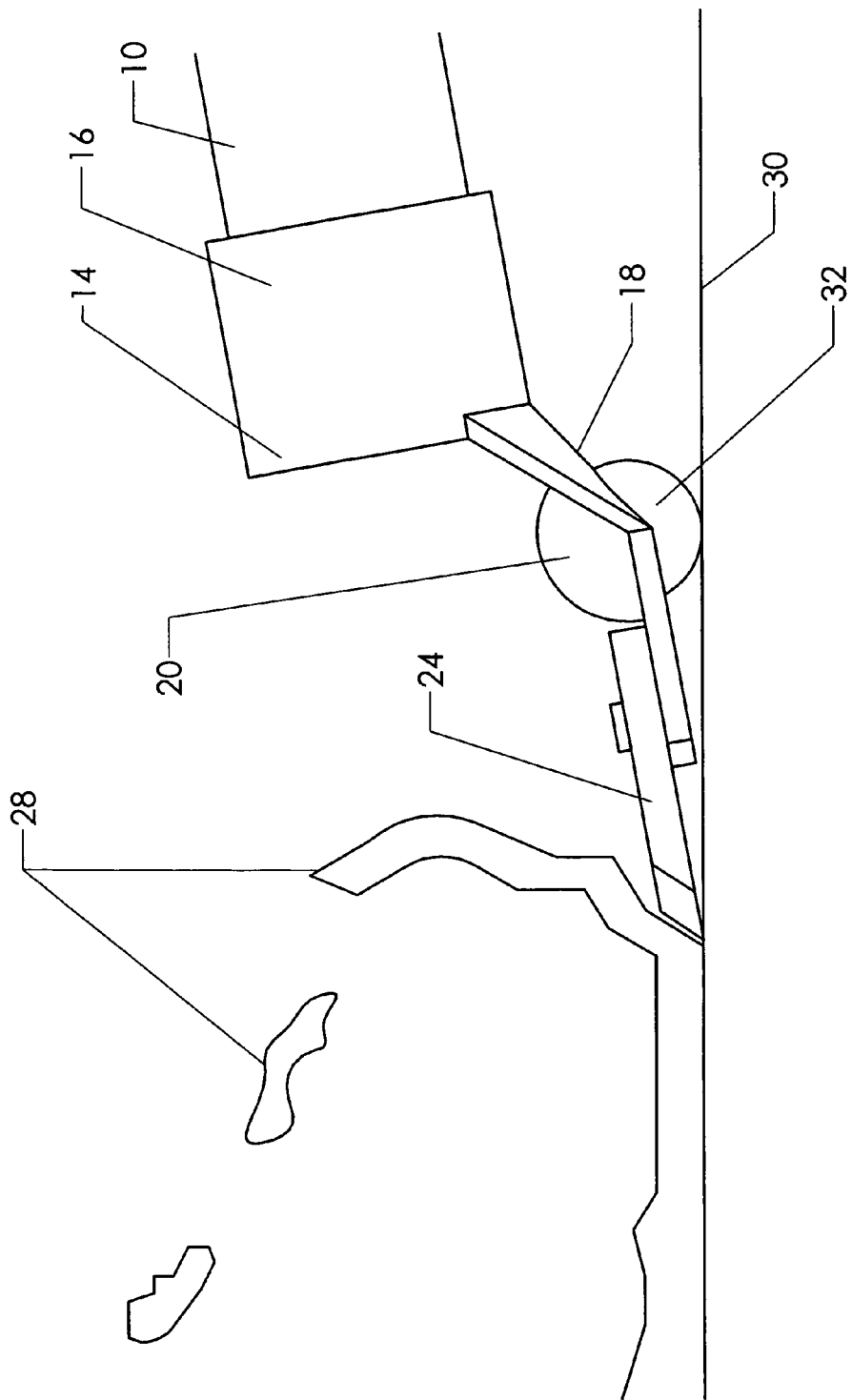
FIG. 3 is a side view, showing operation of the present invention.

Turning to FIG. 3, the present invention is illustrated in use. The reader will observe that track ball 32 rolls along surface 30. Track ball 32 allows the attachment to glide across surface 30 and maintains scraper 24 at the desired angle for optimal operation. The edge of scraper 24 slides along surface 30 in front of blow tube 10 and peels debris 28 from surface 30. Debris 28 may be dried mud, wet leaves, pine straw, or other items. When debris 28 is lifted and separated from surface 30, the air stream exiting blower tube 10 catches debris 28 and carries it away.

Track ball 32 may be attached within housing 20 by a shaft passing through the center of track ball 32. This would permit track ball 32 to roll in the forward and rearward direction. Because of the curved shape of track ball 32, the user could also easily roll the attachment to the left or right. Alternatively, track ball housing 20 may wrap around track ball 32 a sufficient amount to hold track ball 32 within the housing while permitting track ball 32 to rotate in a range of 360 degrees (thus allowing lateral movement in addition to forward and rearward movement).

The reader will further observe that attachment plate 18 extends away from collar 16 at an approximately 45 degree angle relative to the center axis of blower tube 10. Attachment plate 18 also has an approximately 45 degree bend near the middle of attachment plate 18. This geometry puts scraper 24 on a plane that is substantially parallel with the center axis of blower tube 10. This orientation has been tested in the field and is preferred for best performance.

Coupler 14 and scraper 24 may be made of various structurally resilient materials including but not limited to metal and plastic. In another embodiment, scraper 24 may also be made of a more flexible material such as a flexible plastic or rubber. This embodiment may be used to remove puddles of water or other pooled substances since the flexible material will more closely conform to surface 30.

Figure 4A:
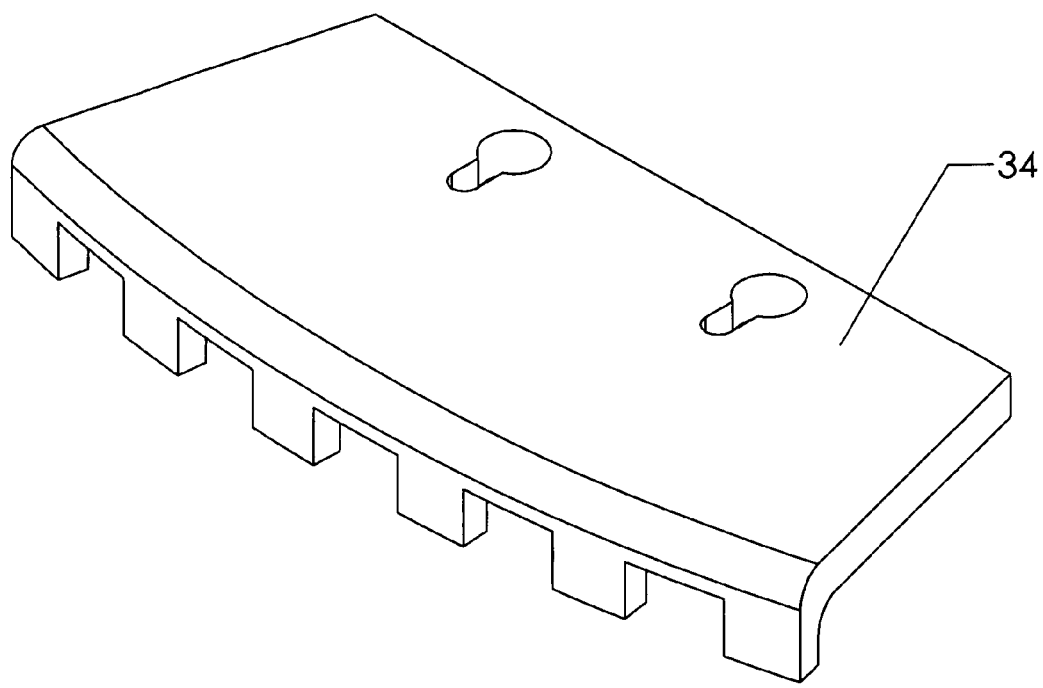
FIG. 4A is a perspective view, showing a rake tool which may be used interchangeably with the scraper.
Figure 4B:
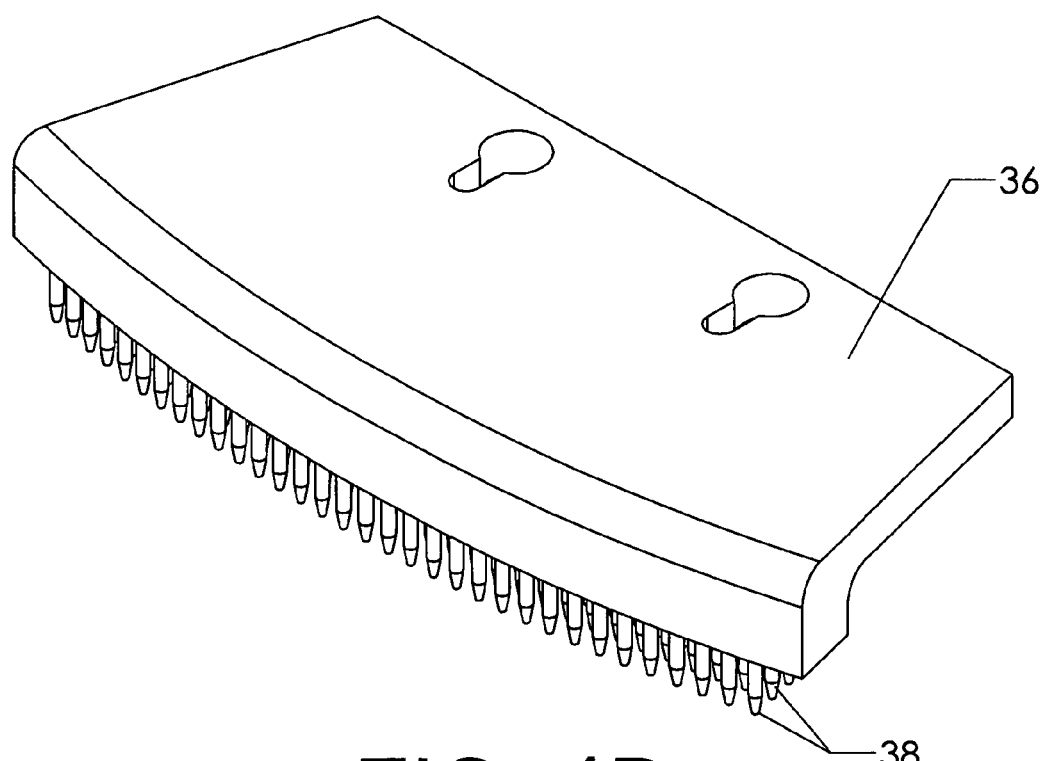
FIG. 4B is a perspective view, showing a brush which may be used interchangeably with the scraper.

FIGS. 4A and 4B show other tools which may used with coupler 14 in place of scraper 24. FIG. 4A illustrates rake 34 which may be attached to attachment plate 18. Rake 34 has teeth or tines that extend downward toward surface 30 when rake 34 is attached to attachment plate 18. This tool is particularly well suited for use on lawns or when working around rocks or gravel. FIG. 4B illustrates brush 36. Brush 36 has bristles 38 which extend downward toward surface 30 when brush 36 is attached to attachment plate 18. This tool is particularly well suited for removing dirt and sand from concrete surfaces. Many other tools may also be provided with coupler 14 for other applications The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described my invention, I claim:

1. An attachment for a lawn blower having an air tube and a nozzle at an end of said air tube, said attachment useful for separating debris from a surface, comprising:
   a. a coupler having a first portion configured to attach to said nozzle of said air tube and a second portion extending away from said nozzle when said first portion is attached to said nozzle;
   b. a scraper configured to removably attach to said second portion of said coupler;
   c. wherein said scraper is configured to slide along said surface thereby lifting and separating said debris from said surface so that said debris is blown away by said lawn blower; and
   d. a rolling device attached to said second portion of said coupler, said rolling device being positioned to lie on said surface and support the weight of said coupler and said scraper.

2. The attachment of claim 1, wherein said rolling device comprises a track ball.

3. The attachment of claim 1, wherein said first portion comprises a collar configured to wrap around said nozzle of said lawn blower.

4. The attachment of claim 1, wherein said second portion comprises an attachment plate having a first end, a second end, and a medial portion therebetween.

5. The attachment of claim 4, further comprising an attachment means for attaching said scraper to said coupler, said attachment means being located on said attachment plate.

6. The attachment of claim 4, wherein said rolling device is attached to said coupler at said attachment plate.

7. The attachment of claim 1, further comprising a rake configured to removably attach to said second portion of said coupler in place of said scraper such that said scraper and said rake may be used interchangeably on said coupler.

8. The attachment of claim 1, further comprising a brush configured to removably attach to said second portion of said coupler in place of said scraper such that said scraper and said rake may be used interchangeably on said coupler.

9. An attachment for a lawn blower having an air tube and a nozzle at an end of said air tube, said attachment useful for separating debris from a surface, comprising:
   a. a coupler having a first portion configured to attach to said nozzle of said air tube and a second portion extending away from said nozzle when said first portion is attached to said nozzle;
   b. a plurality of tools configured to interchangeably attach to said second portion of said coupler, said plurality of tools including a scraper;
   c. wherein said scraper is configured to slide along said surface thereby lifting and separating said debris from said surface so that said debris is blown away by said lawn blower; and
   d. a rolling device attached to said second end of said coupler.

10. The attachment of claim 9, wherein said rolling device comprises a track ball.

11. The attachment of claim 9, wherein said first portion comprises a collar configured to wrap around said nozzle of said lawn blower.

12. The attachment of claim 9, wherein said second portion comprises an attachment plate.

13. The attachment of claim 12, further comprising an attachment means for attaching said scraper to said coupler, said attachment means being located on said attachment plate.

14. The attachment of claim 9, said plurality of tools further comprising a rake configured to removably attach to said second portion of said coupler in place of said scraper such that said scraper and said rake may be used interchangeably on said coupler.

15. The attachment of claim 9, said plurality of tools further comprising a brush configured to removably attach to said second portion of said coupler in place of said scraper such that said scraper and said rake may be used interchangeably on said coupler.

* * * * *